F. Wilford.
Cistern Wall.
Nº 499.
31,503.
Patented Feb. 19, 1861.
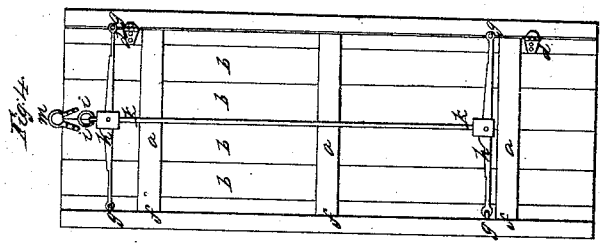
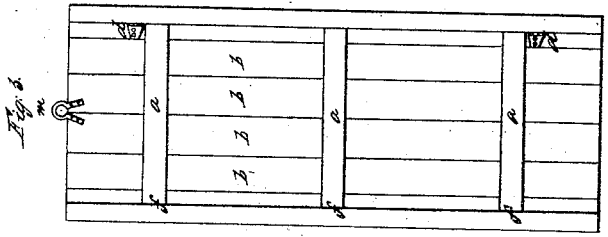
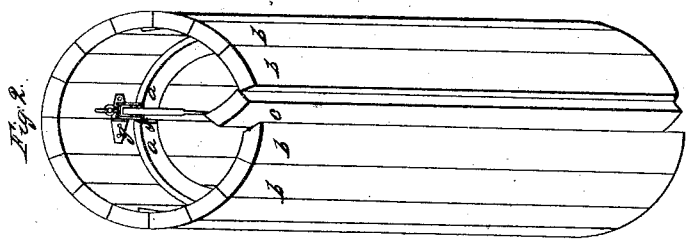
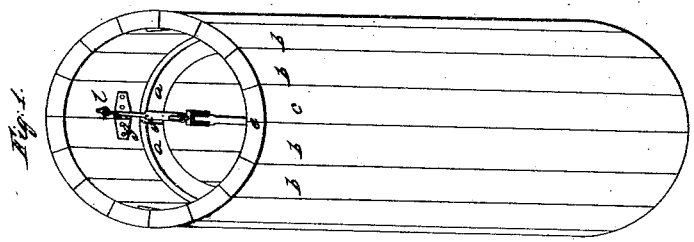
Witnesses:
John James
Peter Winne
Inventor:
Fredrick Wilford

UNITED STATES PATENT OFFICE.

FREDRICK WILFORD, OF EAGLE, WISCONSIN.

APPARATUS FOR WALLING WELLS, CISTERNS, &c., WITH GROUT.

Specification of Letters Patent No. 31,503, dated February 19, 1861.

*To all whom it may concern:*

Be it known that I, FREDRICK WILFORD, of the town of Eagle, in the county of Waukesha and State of Wisconsin, have invented a new and useful Improvement in the Apparatus Used in Walling Wells, Cisterns, and Mine-Shafts with Grout; and I do hereby declare that the following is a full and exact description thereof, reference being had to the accompanying drawings, making a part of this specification, in which—

Figure 1, is a perspective elevation, with the movable stave, hereafter described, in plan; Fig. 2, is also a perspective elevation, but with the movable stave displaced, or swung inward on its hinges, as when the apparatus is being raised as hereinafter described; Fig. 3 is a plain longitudinal section, showing, merely, the interior of the staves and ribs, one half of each hinge, and one of the tail-loops or ears; Fig. 4, is also a plain longitudinal section, but shows the extension braces or stretchers with their connecting-rod, as seen when they are extended to keep the movable stave in place, as seen in Fig. 1, and shows also, the springring at the top of the connecting-rod; the other half of the hinges, and the other bail-loop.

To enable others skilled in the art to make and use my invention, I will here describe its construction and operation.

I construct my apparatus in the form of a hollow cylinder, of the length and diameter desired. For walling deep wells, about ten feet long, and thirty to forty inches in diameter, has been found the most convenient size. In constructing it, I first make two or more circular ribs, of uniform diameter, (as shown at "$a$" in all the figures,) of either wood or metal, and of sufficient strength to sustain the pressure from without, when the grout is being filled around the cylinder as hereafter described. To the periphery of these ribs, (they being placed at the appropriate distance apart, to balance the pressure before mentioned,) I attach, by means of screws, rivets or bolts, segmental staves (as shown at "$b\ b$" and $c$ in all the figures,) until the cylinder is formed, except one stave. These staves I make about one inch and a half thick, and six to eight inches wide. But the width must be uniform; and so regulated that an equal number can be placed on each semi-circumference of the ribs, and still leave a space of eight to ten inches wide to receive the movable, or swinging stave or section, shown at "$c$" "$c$," Figs. 1 and 2. This movable stave is not, however, attached to the ribs; but when the staves are all attached except this one, I saw out and remove so much of all the ribs as crosses this space, and hang the movable or swinging stave to one of those adjoining the space, by means of strong hinges, placed near the ends on the inside, (the hinges playing inward,) as shown at "$d, d, d, d$," Figs. 3 and 4. This movable stave, with the one against which it shuts or closes, should have their edges in contact beveled enough to allow a free swing to the movable stave; but not so much as to cause the corresponding edges to glance or slide upon each other, when subjected to external compression. The bevel mentioned is shown at "$e$," Figs. 1 and 2. I next saw the ribs in two at the points, and in the manner, (leaving the ends beveling,) shown at "$f$," in all the figures. These points should be opposite to the center of the movable or swinging stave, and immediately at the joint of the staves meeting at those points. The two halves of the cylinder are then to be strongly united together at this joint, by hinges, near the upper and lower ends; the hinges being placed on the inside of the staves, and playing inward, as shown at "$g$," Figs. 1 and 2.

The stretchers or extension braces are next fixed in the inside of the cylinder. These stretchers or braces are two in number—one for the upper, and one for the lower end of the cylinder—as shown at "$h\ h$," Fig. 4. Each brace or stretcher is made with a stop or shouldered joint in the middle—similar to that in the extension braces of a chaise top. The object of this joint is, that the braces or stretchers may be sprung upward, by a pull on the spring ring, at "$i\ i$" above the joint; but not downward, below a slight depression below a straight line; and from which latter position, they may not be sprung upward by pressure at their ends.

Each stretcher or brace should terminate, at both ends, with a hook, to work in an eye, as seen at "$J, J, J, J$," Fig. 4, so as to form a variable joint. The eyes should each have a screw-shank, so that it may be screwed to the staves of the cylinder. A convenient method of construction is to cut the threads on the shanks right and left; to the end that each brace, with its hook and eye, may be screwed to its place, by turning the brace, itself, in one direction, before connecting it with the other by the connecting-rod.

The stretchers or extension braces are connected and operated together, by means of a connecting-rod, as shown at "$k, k$," Fig. 4. One end of each stretcher or brace, (by means of its hook and eye before described,) is to be attached to the inside of the movable or swinging stave, near its opening, and near the top and bottom thereof; and the other end at a point on the inside of the stave directly opposite, as seen at "$l$," Fig. 1. The connecting-rod, "$k\ k$," Fig. 4, terminates at the top with a ring, "$i\ i$," Fig. 4, which I call the spring-ring, as, by means of it, a pull may be made on the center of the stretchers, in order to spring them upward, and thus swing the movable stave inward.

At the top of the cylinder, (and at points at right angles to the points where the stretchers are attached,) I attach what I call bail-loops. These are seen at "$m$," Figs. 3 and 4. When suspending, lowering, or raising the cylinder, a bail, (jointed in the middle,) is hooked into these bail-loops; and to this bail, a rope is attached, which passes to a windlass at the mouth of the well, cistern or mine shaft. The windlass, of course, controls the operation of suspending lowering &c.

I will next describe the method of operating my invention, in walling a well. If there be water in the well which can not be removed, a curb must be sunk, or other foundation formed, extending above the water. If the water can be removed, the operation may proceed directly from the bottom of the well. The cylinder, extended to full size, as seen in Fig. 1, is lowered, by the means mentioned, into the well, and rested on the bottom or other foundation. It is there plumbed and made steady. The space around the cylinder, is now to be filled with grout to the top of the cylinder, and the whole suffered to remain until the grout has set or hardened so as to stand without support. This it will soon do, if properly compounded. The stretchers or extension braces are then to be strung upward by a pull on the spring-ring; when, of course, the movable or swing stave will be drawn or swung inward; and the two main halves of the cylinder will collapse, as it were, upon their hinges—particularly when a pull is made upon the bail. In this manner the superficies of the cylinder become so far diminished, that the cylinder is easily drawn up. By means of the windlass, rope and bail already mentioned, the cylinder is now to be drawn upward until its lower end is within a few inches of the top of the grout wall already filled in. Then the stretchers are again to be extended by pressing down the connecting-rod. This will force the movable stave into its place, when the cylinder will resume its full size. After it has been again plumbed, the space around it is to be again filled with grout, as before. In this manner the operations are proceeded with, until the wall is built to the mouth of the well.

I do not claim as any part of my invention, the use or application of a hollow cylinder in the process of walling wells, cisterns, or mine shafts; as this has been known and practiced before; but What I do claim as my invention, and desire to secure by Letters Patent, is, 1. A hollow cylinder, to be constructed in two main parts and hinged together, in combination with the movable or swinging stave and the stretchers or extension braces; to be constructed and operated substantially as herein described and set forth.

2. The movable or swinging stave, in combination with the stretchers or extension braces and connecting-rod; the whole to be constructed and operated substantially as herein described and set forth.

FREDRICK WILFORD.

In presence of—
JOHN JAMES,
PETER WINNE.